(12) United States Patent
Hargrave

(10) Patent No.: US 10,247,330 B2
(45) Date of Patent: Apr. 2, 2019

(54) ADJUSTABLE PIPE SUPPORT ASSEMBLY

(71) Applicant: Wade Hargrave, Lafayette, LA (US)

(72) Inventor: Wade Hargrave, Lafayette, LA (US)

( * ) Notice: Subject to any disclaimer, the term of this patent is extended or adjusted under 35 U.S.C. 154(b) by 146 days.

(21) Appl. No.: 15/274,743

(22) Filed: Sep. 23, 2016

(65) Prior Publication Data

US 2017/0089492 A1    Mar. 30, 2017

Related U.S. Application Data

(60) Provisional application No. 62/222,984, filed on Sep. 24, 2015, provisional application No. 62/308,918, filed on Mar. 16, 2016.

(51) Int. Cl.
| | |
|---|---|
| *F16L 3/137* | (2006.01) |
| *F16L 3/10* | (2006.01) |
| *F16L 55/035* | (2006.01) |
| *F16L 58/00* | (2006.01) |

(52) U.S. Cl.
CPC .......... *F16L 3/1058* (2013.01); *F16L 3/1091* (2013.01); *F16L 55/035* (2013.01); *F16L 58/00* (2013.01)

(58) Field of Classification Search
CPC ....... F16L 3/1091; F16L 3/1058; F16L 3/137; F17C 2205/0192
USPC .............................. 248/74.1, 74.2, 74.3, 74.4
See application file for complete search history.

(56) References Cited

U.S. PATENT DOCUMENTS

| | | | | |
|---|---|---|---|---|
| 1,470,529 A * | 10/1923 | Gerber | ...................... | F16L 3/18 248/49 |
| 3,227,406 A * | 1/1966 | Shelton | ................. | F16L 3/1091 248/74.4 |
| 3,241,800 A * | 3/1966 | Richter, III | ............ | A47G 33/08 248/230.9 |
| 4,445,656 A * | 5/1984 | Leitch | ................... | F16L 3/1058 24/23 R |
| 4,730,800 A * | 3/1988 | Engman | .................. | E21F 17/02 248/316.5 |
| 4,993,670 A * | 2/1991 | Tesar | .................... | F16L 3/1091 248/68.1 |
| 5,102,073 A * | 4/1992 | Lestenkof, Jr. | ......... | F16L 3/227 138/106 |
| 5,163,642 A * | 11/1992 | Torrens | ..................... | F16L 3/00 248/49 |
| 5,190,260 A * | 3/1993 | Daubenspeck | ........... | F24H 9/06 248/146 |
| 5,215,281 A * | 6/1993 | Sherman | ............... | F16L 3/1207 248/219.4 |
| 5,222,701 A * | 6/1993 | Rowland | ............. | B65H 75/366 248/222.13 |
| 5,284,267 A * | 2/1994 | Polletta | ..................... | F17C 7/00 220/4.14 |

(Continued)

Primary Examiner — Bradley Duckworth
(74) Attorney, Agent, or Firm — Ted M. Anthony

(57) ABSTRACT

A pipe support assembly for use in the pipeline transmission industry. More particularly, an adjustable pipe support assembly for use in bracing and securing a section of pipe, while being able to removably detach a strap of said support assembly from said pipe, and thus, monitor and inspect an outer coating of said pipe for corrosion and/or any other possible damage to said pipe. More particularly still, a pipe support assembly having a plurality of pipe chocks with vibration regulators for use in preventing and controlling any vibratory movements of said pipe.

6 Claims, 12 Drawing Sheets

(56) References Cited

U.S. PATENT DOCUMENTS

| | | | | |
|---|---|---|---|---|
| 5,393,024 A * | 2/1995 | Daubenspeck | F24H 9/06 | |
| | | | 248/146 | |
| 5,474,269 A * | 12/1995 | Kasubke | F16L 3/12 | |
| | | | 248/230.9 | |
| 5,566,916 A * | 10/1996 | Bailey | F16L 3/1226 | |
| | | | 24/277 | |
| 5,971,336 A * | 10/1999 | McCraney | F16L 3/04 | |
| | | | 248/154 | |
| 6,105,907 A * | 8/2000 | Komsitsky | F16L 3/04 | |
| | | | 248/346.03 | |
| 6,126,122 A * | 10/2000 | Ismert | F16L 3/221 | |
| | | | 24/271 | |
| 6,142,428 A * | 11/2000 | Kamata | F16L 3/1207 | |
| | | | 248/49 | |
| 6,202,674 B1 * | 3/2001 | Wingett | F17C 13/083 | |
| | | | 137/343 | |
| 6,402,096 B1 * | 6/2002 | Ismert | F16L 3/221 | |
| | | | 24/271 | |
| 6,463,631 B2 * | 10/2002 | Noda | F16L 3/1025 | |
| | | | 24/16 R | |
| 6,494,412 B2 * | 12/2002 | Gombert | H02G 3/263 | |
| | | | 24/297 | |
| 6,729,588 B2 * | 5/2004 | Wilkinson, III | F16L 3/1008 | |
| | | | 248/74.1 | |
| 6,969,034 B2 * | 11/2005 | Ware | F16L 3/137 | |
| | | | 248/218.4 | |
| 7,140,579 B2 * | 11/2006 | Kirschner | F16L 3/1016 | |
| | | | 248/74.1 | |
| 7,150,437 B1 * | 12/2006 | Teeters | F16L 3/04 | |
| | | | 248/70 | |
| 7,213,790 B2 * | 5/2007 | Bailey | F16L 3/1016 | |
| | | | 248/65 | |
| 7,331,549 B2 * | 2/2008 | Wirth, Jr. | F16L 3/10 | |
| | | | 248/65 | |
| 7,377,472 B2 * | 5/2008 | Brown | F16L 3/10 | |
| | | | 24/16 R | |
| 7,475,513 B2 * | 1/2009 | Parker | F16L 3/1091 | |
| | | | 248/49 | |
| 7,931,244 B1 * | 4/2011 | Sipe | E03C 1/021 | |
| | | | 211/60.1 | |
| 7,997,541 B2 * | 8/2011 | Pothanikat | F16L 59/135 | |
| | | | 248/560 | |
| 8,398,033 B2 * | 3/2013 | Booth | F16L 3/1008 | |
| | | | 248/63 | |
| 8,408,501 B2 * | 4/2013 | Noyes | F16L 3/1025 | |
| | | | 248/68.1 | |
| 8,602,798 B2 * | 12/2013 | Downing | F16L 3/00 | |
| | | | 248/65 | |
| 8,991,774 B2 * | 3/2015 | Hajduch | B65D 63/00 | |
| | | | 248/220.22 | |
| 9,447,899 B2 * | 9/2016 | Minami | B64D 37/005 | |
| 9,534,709 B2 * | 1/2017 | Wilson | F16L 3/227 | |
| 9,777,870 B2 * | 10/2017 | Roth | F16L 3/00 | |
| 9,890,876 B2 * | 2/2018 | Sapsay | F16L 1/0246 | |
| 9,938,025 B2 * | 4/2018 | Faure | B64G 1/402 | |
| 2003/0029977 A1 * | 2/2003 | Kim | A47B 81/007 | |
| | | | 248/230.8 | |
| 2003/0038217 A1 * | 2/2003 | Rivers | F16L 3/1066 | |
| | | | 248/74.1 | |
| 2013/0118627 A1 * | 5/2013 | Utay | F16L 3/1016 | |
| | | | 138/106 | |
| 2014/0061395 A1 * | 3/2014 | Allivato, Sr. | F16L 3/1058 | |
| | | | 248/67.7 | |
| 2015/0059826 A1 * | 3/2015 | Reed | F24J 2/5264 | |
| | | | 136/246 | |
| 2016/0116083 A1 * | 4/2016 | Olsen | F16B 2/06 | |
| | | | 248/74.1 | |
| 2016/0340859 A1 * | 11/2016 | Lisin | F16L 3/1091 | |
| 2017/0204993 A1 * | 7/2017 | Eljaouhari | F16L 3/20 | |

* cited by examiner

ADJUSTABLE PIPE SUPPORT ASSEMBLY

PRIORITY OF U.S. PROVISIONAL PATENT APPLICATION Ser. No. 62/222,984, FILED Sep. 24, 2015, U.S. PROVISIONAL PATENT APPLICATION Ser. No. 62/308,918, FILED Mar. 16, 2016, AND U.S. PROVISIONAL PATENT APPLICATION Ser. No. 62/311,666, FILED Mar. 22, 2016, INCORPORATED HEREIN BY REFERENCE, IS HEREBY CLAIMED.

STATEMENTS AS TO THE RIGHTS TO THE INVENTION MADE UNDER FEDERALLY SPONSORED RESEARCH AND DEVELOPMENT

NONE

BACKGROUND OF THE INVENTION

Field of the Invention

The present invention pertains to a pipe support assembly for use in the pipeline transmission industry. More particularly, the present invention pertains to an adjustable pipe support assembly for use in bracing and securing a section of pipe, while being able to removably detach said support assembly from said pipe, and thus, monitor and inspect an outer coating of said pipe for corrosion and/or any other possible damage to said pipe. More particularly still, the present invention pertains to a pipe support assembly for use in preventing and controlling any vibratory movements of said pipe.

Brief Description of the Prior Art

Conventional pipe clamps are generally bolted or otherwise attached to a pipe in order to create a plurality of points of connection for an interconnecting support brace or any other similar support device. However, in most cases, said conventional pipe clamps can be relatively heavy to lift and generally do not conform to a pipe surface, especially during any rapid movement or vibration of said pipe. As a result, said non-conforming conventional pipe clamps create resistance against the pipe surface, thereby causing additional wear and tear and damage to an outer coating of said pipe, thus, making said pipe clamp difficult to remove from the pipe.

Moreover, when attempting to remove said conventional rigid clamps, anchor bolts, that are generally used to attach said clamps to a base plate, are typically damaged. As a result, the damage to said anchor bolts thus compounds a cost of repairing and replacing said clamps by adding additional operators and equipment to assist in repairing the damaged anchor bolts and in removing the relatively heavy clamps.

Further, pipe chocks are generally used in conjunction with said pipe clamps to order to help stabilize pipe, or other similar tubing, in the oil and gas industry, and said pipe chocks are generally the most effective product in the prevention of pipe roll-off. However, conventional pipe chocks lack an effective means of preventing vibration within said pipe, and therefore, are typically manufactured to account for potential vibratory movements.

Current governmental regulations require operators of pipelines to periodically inspect underneath these conventional pipe clamps for possible corrosion to said pipes and for any other issues that may be visible to said pipes. However, even though governmentally required, this periodic inspection to said conventional pipe clamps is generally not being followed due to relatively heavy equipment, a lack of personnel to conduct said inspection, and a variety of other safety issues that can occur when attempting to remove and inspect said conventional pipe clamps. As a result, when a conventional pipe clamp is unable to be removed from said pipe, inspection of said pipe can be relatively more difficult, and thus, corrosion at said pipe and pipe support is more likely to occur. Consequently, corrosion at said pipe and said pipe support is one of the most common causes of external piping failure.

As a result, there is a need for a safer, easier, more efficient, and less expensive means to securing said pipe, while being able to be removably detached from said pipe in a safe and efficient manner, thus, allowing for better monitoring and inspection of an outer coating of said pipe for corrosion and/or any other possible damage. Further, there is a need for a more efficient means of preventing vibration within said pipe and said pipe support.

SUMMARY OF THE INVENTION

The present invention pertains to an adjustable pipe support assembly, generally comprising a substantially flexible strap, a plurality of mounting brackets, and a plurality of pipe chocks. In a preferred embodiment, strap comprises a first end and a second end, wherein first end and second end are each manufactured and fused to said mounting bracket. Thus, strap can be manufactured in a desired length in order to fit and encompass a particular size of pipe diameter. In an alternate embodiment, strap comprises a first end and a second end, wherein first end and second end are each attachably bolted to an adjustable mounting bracket having a plurality of apertures to accommodate tightening and loosening of said strap. Therefore, strap can be adjusted in order to fit any variety of different pipe sizes, as necessary.

In a preferred embodiment, the present invention comprises a base plate having a plurality of bolts extending in a relatively upward direction from said plate. Thus, said bolts can be received within a plurality of apertures of said mounting brackets, thereby allowing for said mounting brackets to be attachably connected, or detachably removed, from said base plate. As a result, said strap and/or said mounting brackets can be easily unbolted, and thus, removed from said base plate, thereby providing for a relatively simple and efficient means of removing said pipe support assembly of the present invention from said pipe in order to facilitate an easier and more efficient means of pipe inspection.

In a preferred embodiment, pipe chocks are used to further secure and stabilize said pipe, while preventing any vibratory movements. Pipe chocks can be used with either said single-sized strap and mounting bracket or with said adjustable strap and adjustable mounting bracket. Further, pipe chocks can comprise vibration regulators, wherein vibration regulators can either be retrofit to existing, conventional pipe chocks, or can be manufactured to fit with a particular pipe chock assembly.

An advantage of the adjustable pipe support assembly of the present invention is that the support assembly can be installed correctly on a new pipe support, without requiring specially trained personnel or relatively heavy equipment for removing and installing said pipe support assembly from the pipe. The adjustable support assembly can be removed by at least one person and then replaced to an exact position via use of a hand wrench, or any other similar tool, without the use of relatively heavy lifting machinery and without causing damage to an outer coating of said pipe during removal because the reduced total weight of the adjustable support assembly facilitates the removal and reinstallation of a strap of said pipe support assembly. Thus, as a result, the adjustable support assembly of the present invention further allows for continual inspection of said outer coating of said pipe in a safe, efficient, and easy manner.

Additionally, another advantage of the adjustable pipe support assembly of the present invention is that the use of a flexible mesh strap better accommodates a variety of imperfections in said pipe and can thus better distribute a load around said pipe in order to reduce stress concentrations and localized coating damage to said outer diameter of said pipe. The flexible mesh strap further provides for a consistent and reliable performance of said pipe support assembly, while minimizing a potential for damage to the outer coating of said pipe during installation, inspection, and/or reinstallation.

BRIEF DESCRIPTION OF THE DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
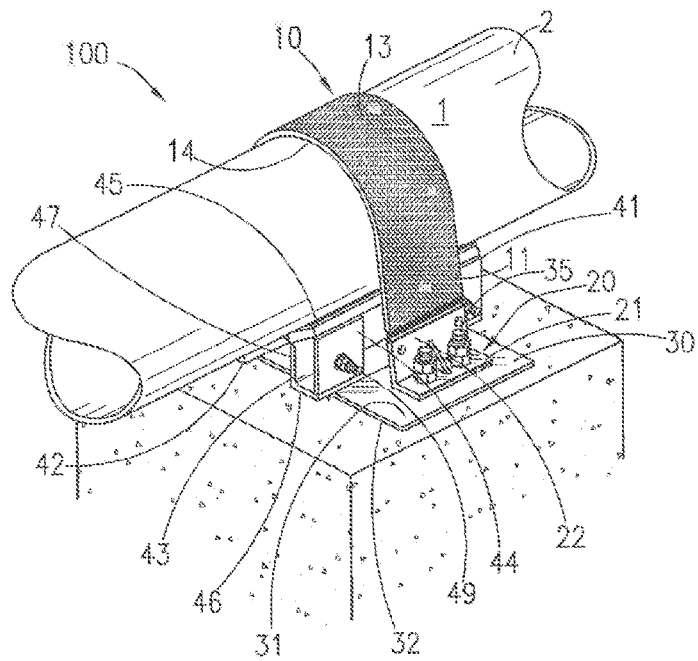
FIG. 1 depicts a perspective view of a preferred embodiment of an adjustable pipe support assembly of the present invention.

Referring to the drawings, FIG. 1 depicts a perspective view of an adjustable pipe support assembly 100 of the present invention generally comprising a band 10, or pipe strap, and a mounting bracket 20. Strap 10 can be manufactured from a substantially rigid material, such as, for example, a metal alloy material, or any other similar material exhibiting like characteristics and that is relatively resistant to corrosion. Thus, strap 10 can be manufactured from a variety of different alloy combinations in order to meet desired operating conditions that involve elevated temperatures or corrosive materials. Further, strap 10 generally comprises a relatively flexible mesh-like construction or configuration, thereby allowing for a relatively lighter weight and substantially more pliable and flexible pipe support, while simultaneously providing a substantially strong and secure hold on a section of pipe 1, or tubing.

In a preferred embodiment, strap 10 of pipe support assembly 100 comprises a first end 11 and a second end 12 each having a substantially rectangular-shaped end configuration, wherein first end 11 and second end 12 are both attachably connected to a mounting bracket 20. Additionally, strap 10 comprises an outer surface 13 and an inner surface 14, wherein inner surface 14 adjacently fits along and conforms to an outer diameter 2, or outer surface, of pipe 1, thereby being able to encapsulate and thus securely hold pipe 1 in a desired location.

In a preferred embodiment, still referring to FIG. 1 pipe support assembly 100 comprises a single-size mounting bracket 20 attachably connected to both first end 11 and second end 12 of strap 10, wherein mounting bracket 20 further joins and reinforces strap 10 to pipe 1, thereby allowing pipe 1 to remain substantially stable and to support pipe 1 at an optimum strength level. Mounting bracket 20 comprises a substantially "L" shaped configuration, having a substantially planar base member 21 and a substantially planar side member 22, wherein side member 22 is perpendicularly connected to base member 21 in a relatively upward direction. First end 11 and second end 12 of strap 10 are connected to side member 22 of mounting bracket 20, thereby creating a cohesive unit. Further, as illustrated in FIG. 1, base member 21 of mounting bracket 20 comprises a plurality of apertures 23 for use in securing and tightening mounting bracket 20, and thus strap 10, to a base plate 30, by way of a plurality of bolts 29, fasteners, adhesives, or any other similar attachment means.

Adjustable pipe support assembly 100 further comprises a plurality of pipe chocks 40, typically a first pipe chock 41 and a second pipe chock 42. First 41 and second 42 pipe chocks are beneficially used for stabilizing a section of pipe 1, and can be manufactured from a relatively rigid material, such as steel, or any other similar material exhibiting desired characteristics. Further, pipe chocks 40 generally comprise a substantially "L" shaped angle bar member 43, a plurality of side bar members 44, and a substantially slanted top bar member 45. Angle bar member 43 comprises a substantially planar bottom surface 46 and a substantially planar side surface 47, wherein side surface 47 is oriented substantially perpendicular to bottom surface 46 in a relatively upward direction. Side bar members 44 are attachably connected to bottom surface 46 of angle bar member 43 in a relatively perpendicular orientation, thus located substantially parallel to side surface 47 of angle bar member 43. Slanted top member 45 is attachably connected to side bar members 44 and side surface 47 of angle bar member 43; top member 45, side bar members 44, and angle bar member 43 coordinate to form an inner cavity within pipe chocks 40.

Base plate 30 comprises a substantially flat, planar surface having a top surface 31 and a bottom surface 32. Base plate 30 further comprises a plurality of anchor bolts 35 that extend in a relatively upward direction from said base plate 30, and that are axially aligned with apertures 23 of base member 21 of mounting bracket 20, thus allowing for anchor bolts 35 to be received within apertures 23, thereby allowing mounting bracket 20 of pipe support assembly 100 to be adjacently connected to top surface 31 of base plate 30.

Bottom surface 46 of angle bar member 43 of pipe chocks 40 is adjacently disposed on top surface 31 of base plate 30; slanted top member 45 of pipe chocks 41, 42 adjacently contacts outer surface 2 of pipe 1, thereby providing a secure and stable manner in which pipe 1 can be positioned. Additionally, although not depicted in FIG. 1, side surface 47 of angle bar member 43 and side bar member 44 comprise a plurality of apertures 48 that are axially aligned for use in bolting and securing a first pipe chock 41 to a second pipe chock 42 by way of a pipe chock centralizer 49, or stabilizer, in order to prevent vibration and to provide a more stable and secure attachment.

In a preferred embodiment, the present invention further comprises a method of securing and bracing a pipe 1 by way of adjustable pipe support assembly 100. The method comprises adjusting a pipe strap 10 in order to securely support said pipe 1, while still being able to inspect an outer coating 2 of said pipe 1 with ease. This method eliminates a process of having to remove an entire pipe clamp from a pipe in order to inspect for corrosion or other damage on said pipe and said pipe clamp, and ultimately, further damaging said pipe in the process. Thus, as a result, the method of the present invention is a safer, more efficient, and less expensive means of securing a pipe 1, while being able to properly monitor and inspect said pipe 1.

Figure 2:
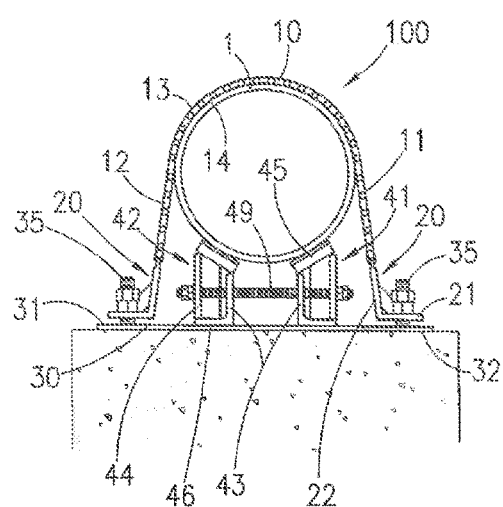
FIG. 2 depicts an end view of a preferred embodiment of an adjustable pipe support assembly of the present invention.

FIG. 2 depicts an end view of a pipe support assembly, generally comprising a single-size mounting bracket 20 fused to first end 11 and second end 12 of strap 10. Strap 10 comprises first end 11 and second end 12, wherein first end 11 and second end 12 are both joined and connected to mounting bracket 20, thus cooperating to form one cohesive unit. Mounting bracket 20 further comprises side member 22 and base member 21, wherein side member 22 and base member 21 are oriented in a substantially perpendicular configuration. Base member 21 of mounting bracket 20 comprises apertures 23 for use in attachably adjoining mounting bracket 20 to base plate 30, wherein base plate 30 further comprises anchor bolts 35 that are axially aligned with bores 23 of base member 21 of mounting bracket 20, thereby allowing anchor bolts 35, or any other similar attachment means, to be received within bores 23 of mounting bracket 20, thus securing mounting bracket 20 and base plate 30 together.

Still referring to FIG. 2, pipe support assembly 100 further comprises first 41 and second 42 pipe chocks for use in supporting a section of pipe 1, wherein pipe chocks 40 comprise angle bar member 43, side members 44, and substantially slanted top member 45. Additionally, side surface 47 of angle bar member 43 and side bar member 44 comprise a plurality of apertures 48 that are axially aligned for use in bolting and securing a first pipe chock 41 to a second pipe chock 42 by way of pipe chock centralizer 49, or stabilizer. Pipe chock centralizer 49 comprises a substantially rod-like member that can be bolted to first pipe chock 41 and second pipe chock 42 in order to prevent vibration and to provide a more stable and secure attachment, as illustrated in FIG. 2.

Figure 3:
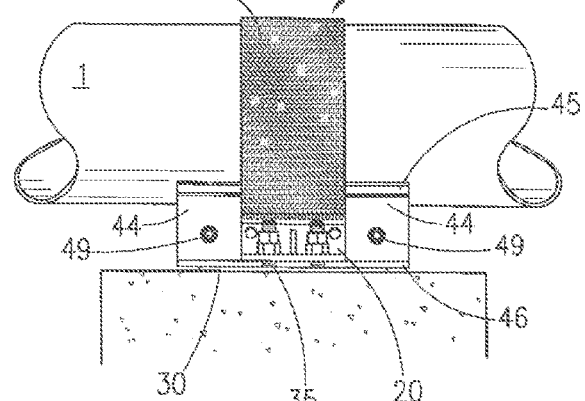
FIG. 3 depicts a side view of a preferred embodiment of an adjustable pipe support assembly of the present invention.

FIG. 3 depicts a side view of a pipe support assembly 100 that is manufactured for a specific size of pipe 1, thus comprising strap 10 that is fused to mounting bracket 20 in order to form a single cohesive component part. As illustrated in FIG. 3, strap 10 is manufactured in a pre-designated length in order to fit and support a particular desired size of piping. Therefore, strap 10 is secured to base plate 30 by way of axially aligning bores 23 of single-size mounting bracket 20 to anchor bolts 35 of base plate 30, and thus, properly fastening mounting bracket 20 to base plate 30 via anchor bolts 35.

Still referring to FIG. 3, pipe support assembly 100 further comprises pipe chocks 40 for use in supporting a section pipe 1. Pipe chocks 40 comprise angle bar member 43, side members 44, and substantially slanted top member 45, wherein base member 46 of angle bar member 43 is positioned on a top surface 31 of base plate 30, and slanted top member 45 is adjacently disposed relatively underneath a section of piping 1 in order to support and hold said piping 1. In addition, although not depicted in FIG. 3, side surface 47 of angle bar member 43 and side bar members 44 comprise a plurality of apertures 48 that are axially aligned for use in bolting and securing a first pipe chock 41 to a second pipe chock 42 by way of pipe chock centralizer 49 in order to prevent vibration and to provide a more stable and secure configuration.

Figure 4:
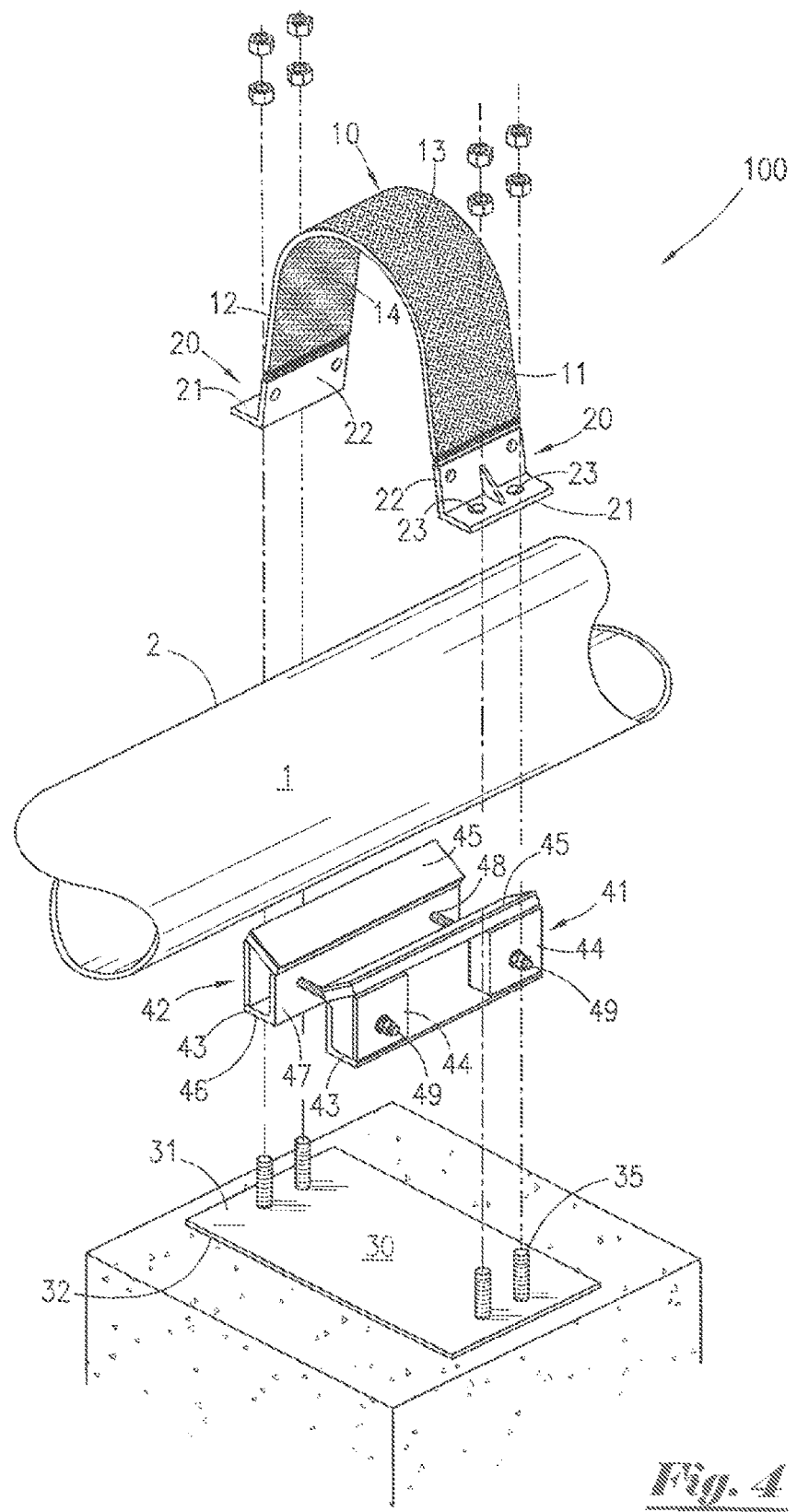
FIG. 4 depicts an exploded view of a preferred embodiment of an adjustable pipe support assembly of the present invention.

FIG. 4 depicts an exploded view of pipe support assembly 100, generally comprising a mounting bracket 20 molded to first end 11 and second end 12 of strap 10, wherein length of strap 10 is tailored to a specific size of pipe 1. Still referring to FIG. 4, pipe support assembly 100 further comprises first 41 and second 42 pipe chocks for use in supporting a section of pipe 1, wherein first 41 and second 42 pipe chocks both comprise angle bar member 43, side members 44, substantially slanted top member 45, and pipe chock centralizers 49.

Figure 5:
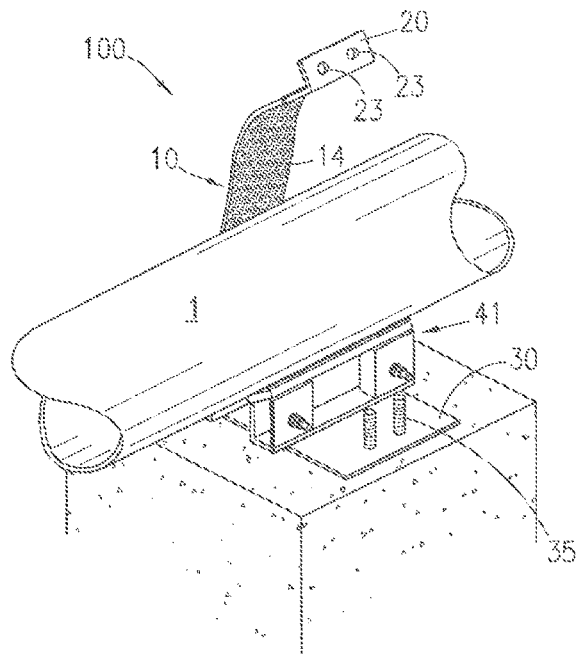
FIG. 5 depicts a perspective view of a preferred embodiment of an adjustable pipe support assembly of the present invention in a detached configuration.

FIG. 5 depicts a perspective view of pipe strap assembly 100 comprising strap 10 and mounting bracket 20 in a detached configuration from base plate 30, illustrating strap 10 and single-size mounting bracket 20 as a single component part of the present invention. Thus, when detaching strap 10 from base plate 30, mounting bracket 20 is unscrewed from anchor bolts 35 of base plate 30, thereby also removing strap 10 from base plate 30, as well.

Figure 6:
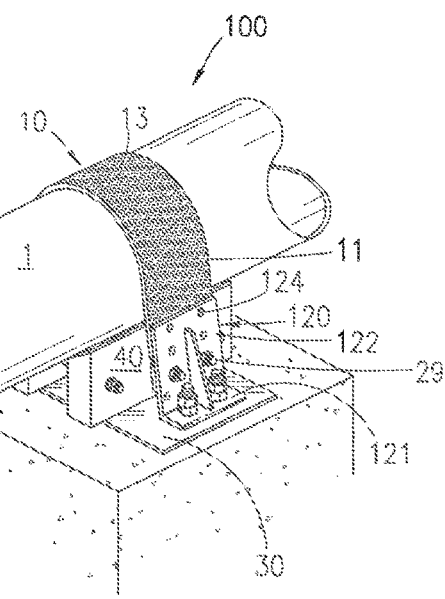
FIG. 6 depicts a perspective view of an alternate embodiment of an adjustable pipe support assembly of the present invention with an adjustable mounting bracket.

FIG. 6 depicts a perspective view of adjustable pipe support assembly 100 comprising adjustable mounting bracket 120. Adjustable mounting bracket 120 comprises side member 122 and base member 121, wherein side member 121 comprises a plurality of apertures 124 stacked in a substantially vertical row for use in being able to tighten or loosen strap 10, as necessary.

As depicted in FIG. 6, strap 10 comprises first end 11 and second end 12, wherein first end 11 and second end 12 are not manufactured to mounting bracket 120, but can be attachably secured to mounting bracket 120 by way of a plurality of bolts 29, fasteners, or any other similar attachment means. Further, although not illustrated in FIG. 6, first end 11 and second end 12 of strap 10 each comprise an adjustment plate 19, wherein adjustment plate 19 comprises a plurality of apertures 18 for use in axially aligning with apertures 124 in order for bolts 29 to attachably secure strap 10 and mounting bracket 120 together. As a result, apertures 124 on side member 122 of mounting bracket 120 allow strap 10 to be adjusted, as necessary, in order to fit a variety of different sizes of pipe 1. Thus, as illustrated in FIG. 6, if a section of pipe 1 is relatively small in diameter, strap 10 can be attachably bolted to apertures 124 on side member 122 of mounting bracket 120 that are positioned towards base member 121 of mounting bracket 120.

Moreover, base member 121 of mounting bracket 120 comprises apertures 123 for use in attachably adjoining mounting bracket 120 to base plate 30, wherein base plate 30 further comprises anchor bolts 35 that are axially aligned with bores 123 of base member 121 of mounting bracket 120, thereby allowing anchor bolts 35 to be received within bores 123 of mounting bracket 120, thus securing mounting bracket 120 and base plate 30 together.

Still referring to FIG. 6, pipe support assembly 100 further comprises pipe chocks 40 for use in beneficially supporting and stabilizing a section of pipe 1. Pipe chocks 40 generally comprise angle bar member 43, side bar members 44, and top member 45, wherein planar base 46 of angle bar 43 is adjacently positioned on top surface 31 of base plate 30 and top member 45 of pipe chock 40 is adjacently positioned substantially underneath and against outer surface 2 of pipe 1, thereby providing support and stability to pipe 1.

Figure 7:
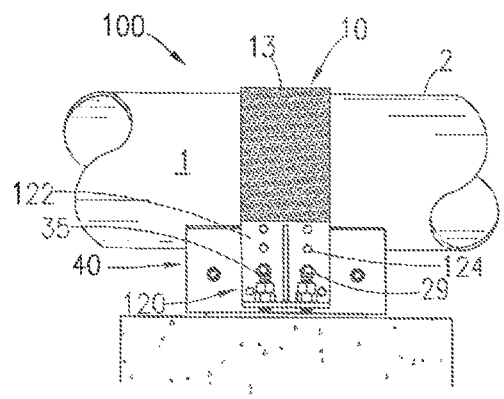
FIG. 7 depicts a side view of an alternate embodiment of an adjustable pipe support assembly of the present invention with an adjustable mounting bracket.

FIG. 7 depicts a side view of adjustable pipe support assembly 100 generally comprising strap 10 attachably connected to adjustable mounting bracket 120. Strap 10 comprises first end 11 and second end 12 each having a substantially rectangular-shaped end configuration, wherein first end 11 and second end 12 each comprise an adjustment plate 19. Adjustment plate 19 comprises apertures 18 for use in axially aligning with apertures 124, thereby affixing strap 10 to adjustable mounting bracket 120 by way of bolts 29. Additionally, strap 10 comprises outer surface 13 and inner surface 14, wherein inner surface 14 adjacently fits along and conforms to outer diameter 2, or outer surface, of pipe 1, thereby being able to encapsulate and thus securely hold pipe 1 in a desired location.

Adjustable mounting bracket 120 comprises side member 122 and base member 121, wherein side member 122 comprises apertures 124 stacked in a substantially vertical row for use in being able to tighten or loosen strap 10, as necessary. As depicted in FIG. 7, strap 10 can be attachably bolted to apertures 124 on side member 122 of mounting bracket 120 that are positioned towards base member 121 of mounting bracket 120 due to said section of pipe 1 having a relatively small diameter. Moreover, base member 121 of mounting bracket 120 comprises bores 123 for use in attachably adjoining mounting bracket 120 to base plate 30, wherein base plate 30 further comprises anchor bolts 35 that are axially aligned with bores 123 of base member 121 of mounting bracket 120, thereby allowing anchor bolts 35 to be received within bores 123 of mounting bracket 120, thus securing mounting bracket 120 and base plate 30 together.

Still referring to FIG. 7, pipe support assembly 100 further comprises pipe chocks 40 for use in beneficially supporting and stabilizing a section of pipe 1. Pipe chocks 40 generally comprise angle bar member 43, side bar members 44, and top member 45, wherein planar base 46 of angle bar 43 is adjacently positioned on top surface 31 of base plate 30 and top member 45 of pipe chock 40 is adjacently positioned against outer surface 2 of pipe 1.

Figure 8:
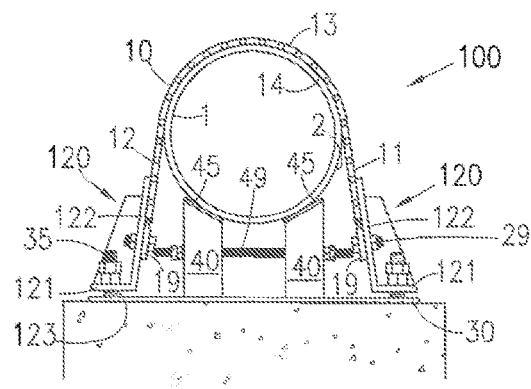
FIG. 8 depicts an end view of an alternate embodiment of an adjustable pipe support assembly of the present invention with an adjustable mounting bracket.

FIG. 8 depicts an end view of adjustable pipe support assembly 100 comprising strap 10 adjustably connected to a relatively lowest aperture 124 and tightest location on adjustable mounting bracket 120. Strap 10 comprises first end 11 and second end 12 each having a substantially rectangular-shaped end configuration, wherein first end 11 and second end 12 each comprise an adjustment plate 19. Adjustment plate 19 comprises apertures 18 for use in attachably connecting to side member 122 of mounting bracket 120, wherein side member 122 of mounting bracket 120 comprises apertures 124 disposed in a relatively vertically stacked position for use in being able to tighten and/or loosen strap 10 as necessary. Thus, as depicted in FIG. 8, strap 10 is bolted to apertures 124 that are positioned towards base member 121 of mounting bracket 120, thereby creating a tightest connection possible in order to accommodate a section of piping having a relatively small diameter in size.

Still referring to FIG. 8, pipe support assembly 100 further comprises pipe chocks 40 for use in beneficially supporting and stabilizing a section of pipe 1. Pipe chocks 40 generally comprise angle bar member 43, side bar members 44, top member 45, and pipe chock centralizer 49, wherein planar base 46 of angle bar 43 is adjacently positioned on top surface 31 of base plate 30 and top member 45 of pipe chock 40 is adjacently positioned against outer surface 2 of pipe 1. Further, pipe chock centralizer 49 can be used to attachably bolt first pipe chock 41 and second pipe chock 42 together by way of axially aligning, and thus connecting, bores 48 of first pipe chock 41 to bores 48 of second pipe chock 42, thereby assisting in further stabilizing and supporting pipe chocks 41, 42, and ultimately, pipe support assembly 100 of the present invention.

Figure 9:
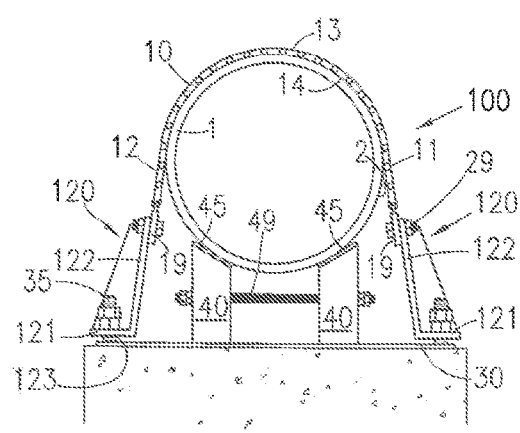
FIG. 9 depicts an end view of an additional alternate embodiment of an adjustable pipe support assembly of the present invention with an adjustable mounting bracket.
Figure 10:
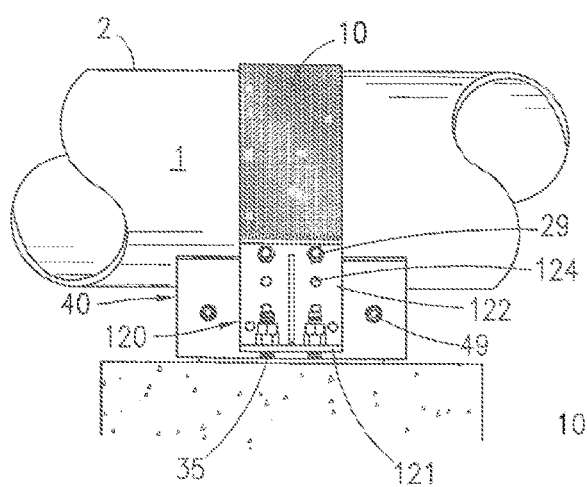
FIG. 10 depicts a side view of an additional alternate embodiment of an adjustable pipe support assembly of the present invention with an adjustable mounting bracket.

Conversely, FIG. 9 depicts an end view of adjustable pipe support assembly 100 comprising strap 10 attachably bolted to mounting bracket 120 at a relatively highest aperture position, and FIG. 10 depicts a side view of adjustable pipe support assembly 100 comprising strap 10 attachably bolted to mounting bracket 120 at a relatively highest aperture position. As illustrated in FIGS. 9 and 10, adjustable pipe support assembly 100 comprises adjustable mounting bracket 120, wherein mounting bracket 120 comprises apertures 124 located along side member 122 for use in being able to tighten or loosen strap 10, as necessary.

As depicted in FIG. 9, strap 10 comprises first end 11 and second end 12 each comprising adjustment plate 19 and apertures 18 for use in attachably connecting to side member 122 of mounting bracket 120, wherein first end 11 and second end 12 are not manufactured to mounting bracket 120, but can be attachably secured to mounting bracket 120 by way of bolts 29, fasteners, or any other similar attachment means. Further, as shown in FIGS. 9 and 10, side member 122 of mounting bracket 120 comprises apertures 124 in a relatively vertically stacked position for use in being able to tighten and/or loosen strap 10 as necessary. As a result, apertures 124 on side member 122 of mounting bracket 120 allow strap 10 to be adjusted, as necessary, in order to fit a variety of different sizes of pipe. Thus, as illustrated in FIGS. 9 and 10, if a section of pipe is relatively large in diameter, strap 10 can be attachably bolted to apertures 124 on side member 122 of mounting bracket 120 that are positioned towards a top end of side member 122 of mounting bracket 120.

Still referring to FIGS. 9 and 10, pipe support assembly 100 further comprises pipe chocks 40 for use in beneficially supporting and stabilizing a section of pipe 1. Pipe chocks 40 generally comprise angle bar member 43, side bar members 44, top member 45, and pipe chock centralizer 49, wherein planar base 46 of angle bar 43 is adjacently positioned on top surface 31 of base plate 30, and top member 45 of pipe chock 40 is adjacently positioned against outer surface 2 of pipe 1. Further, pipe chock centralizer 49 can be used to attachably bolt first pipe chock 41 and second pipe chock 42 together by way of axially aligning, and thus connecting, bores 48 of first pipe chock 41 to bores 48 of second pipe chock 42, thereby assisting in further stabilizing and supporting pipe chocks 40, and ultimately, pipe strap assembly 100 of the present invention.

Figure 11:
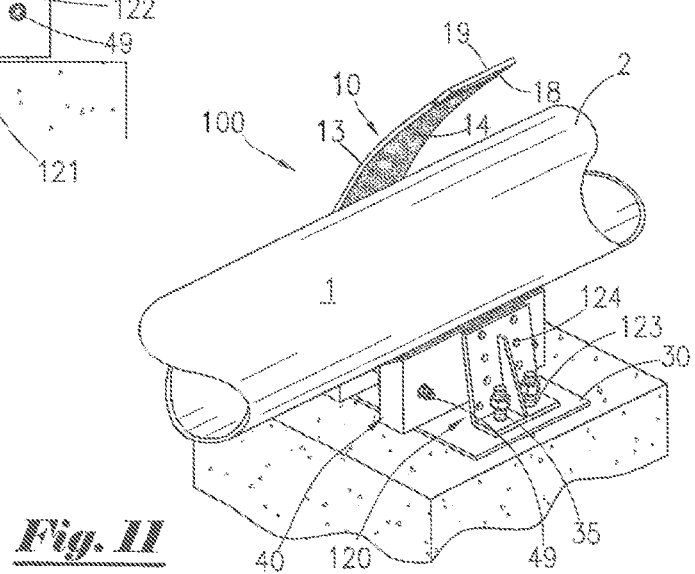
FIG. 11 depicts a perspective view of an additional alternate embodiment of an adjustable pipe support assembly of the present invention with an adjustable mounting bracket in a detached configuration.

FIG. 11 depicts a perspective view of adjustable pipe support assembly 100 in a detached configuration from adjustable mounting bracket 120, illustrating strap 10 and adjustable mounting bracket 120 as separate component parts of the present invention. Thus, when detaching strap 10 from base plate 30, adjustment plate 19 of strap 10 is unscrewed from adjustable mounting bracket 120. Therefore, adjustable mounting bracket 120 can remain bolted and attached to base plate 30, while strap 10 can be detached from mounting bracket 120, and thus, adjusted to fit a desired size of pipe.

Still referring to FIG. 11, pipe support assembly 100 further comprises pipe chocks 40 for use in beneficially supporting and stabilizing a section of pipe. Pipe chocks 40 generally comprise angle bar member 43, side bar members 44, and top member 45, wherein planar base 46 of angle bar 43 is adjacently positioned on top surface 31 of base plate 30 and top member 45 of pipe chock 40 is adjacently positioned substantially underneath and against outer surface 2 of pipe in order to reinforce and brace said pipe 1.

Figure 12:
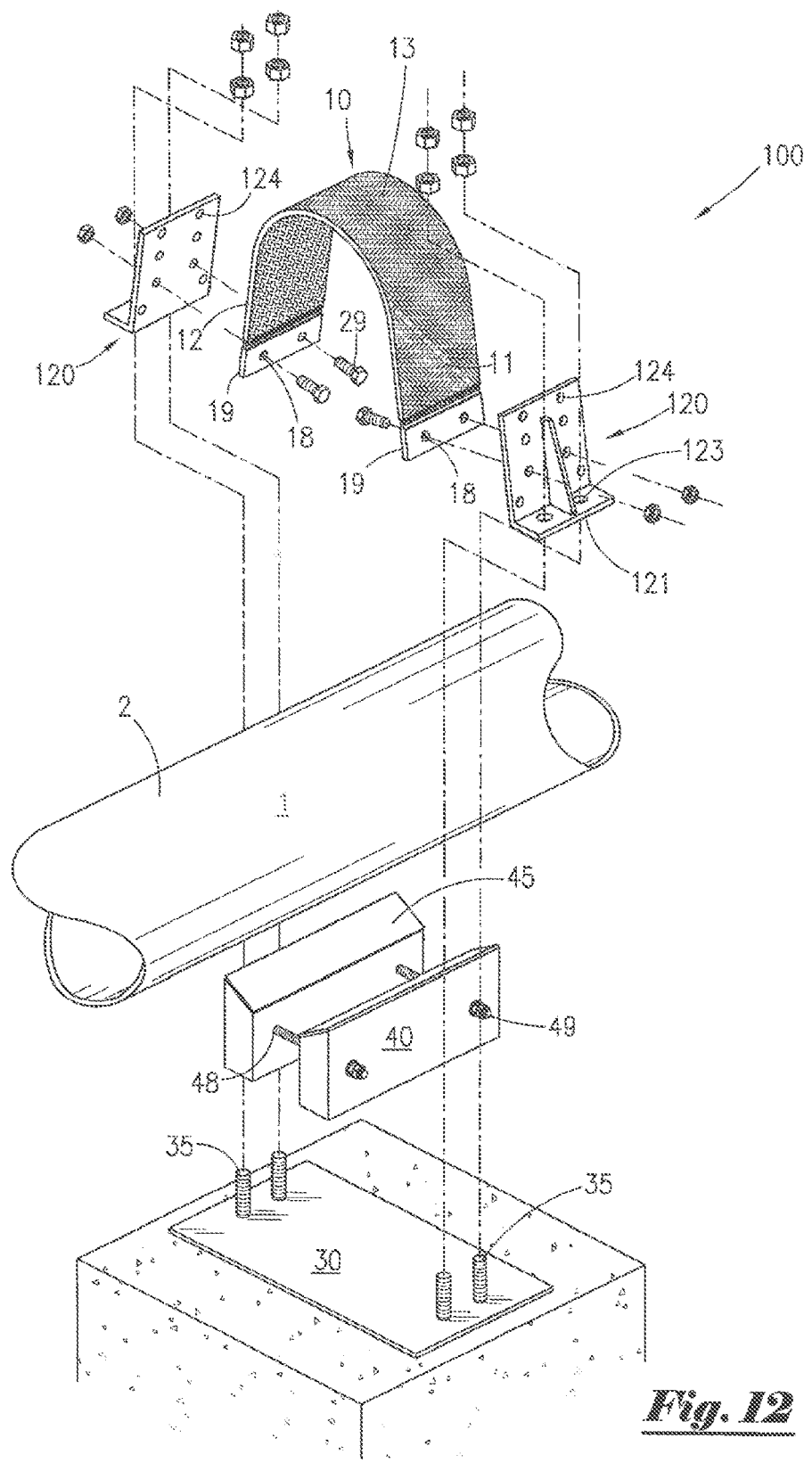
FIG. 12 depicts an exploded view of an additional alternate embodiment of an adjustable pipe support assembly of the present invention with an adjustable mounting bracket.

FIG. 12 depicts an exploded view of adjustable pipe support assembly 100 comprising strap 10 and adjustable mounting bracket 120 having apertures 124 for use in tightening and/or loosening strap 10 around pipe 1, as necessary. Strap 10 comprises first end 11 and second end 12 each having a substantially rectangular-shaped end configuration, wherein first end 11 and second end 12 each comprise an adjustment plate 19. Adjustment plate 19 comprises apertures 18 for use in axially aligning with apertures 124, thereby affixing strap 10 to adjustable mounting bracket 120 by way of bolts 29. Additionally, strap 10 comprises outer surface 13 and inner surface 14, wherein inner surface 14 adjacently fits along and conforms to outer diameter 2, or outer surface, of pipe 1, thereby being able to encapsulate and thus securely hold pipe 1 in a desired location.

Adjustable mounting bracket 120 comprises side member 122 having a plurality of apertures 124 positioned in a substantially vertical row for use in being able to tighten or loosen strap 10, as necessary. Moreover, base member 121 of mounting bracket 120 comprises bores 123 for use in attachably adjoining mounting bracket 120 to base plate 30, wherein base plate 30 further comprises a plurality of anchor bolts 35 that can be axially aligned with bores 123 of base member 121 of mounting bracket 120, thereby allowing bolts 35, or any other similar attachment means, to be received within bores 123 of mounting bracket 120, thus securing mounting bracket 120 and base plate 30 together.

Still referring to FIG. 12, pipe support assembly 100 further comprises pipe chocks 40 for use in beneficially supporting and stabilizing a section of pipe, wherein planar base 46 of angle bar 43 is adjacently positioned on top surface 31 of base plate 30 and top member 45 of pipe chock 40 is adjacently positioned substantially underneath and against outer surface 2 of pipe 1. Additionally, pipe chock centralizer 49 attachably connects first pipe chock 41 to second pipe chock 41, thereby further reinforcing pipe support assembly 100 and preventing vibration.

Figure 13:
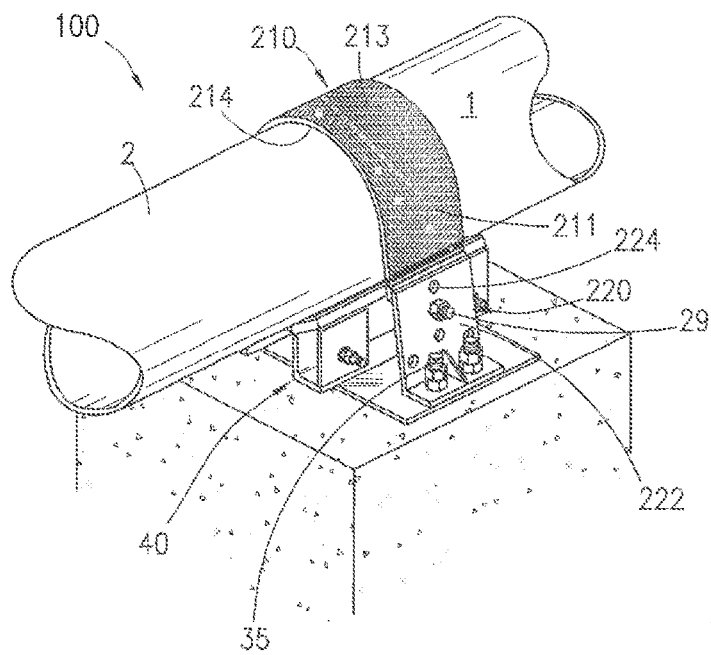
FIG. 13 depicts a perspective view of another alternate embodiment of an adjustable pipe support assembly of the present invention with an adjustable mounting bracket.
Figure 14:
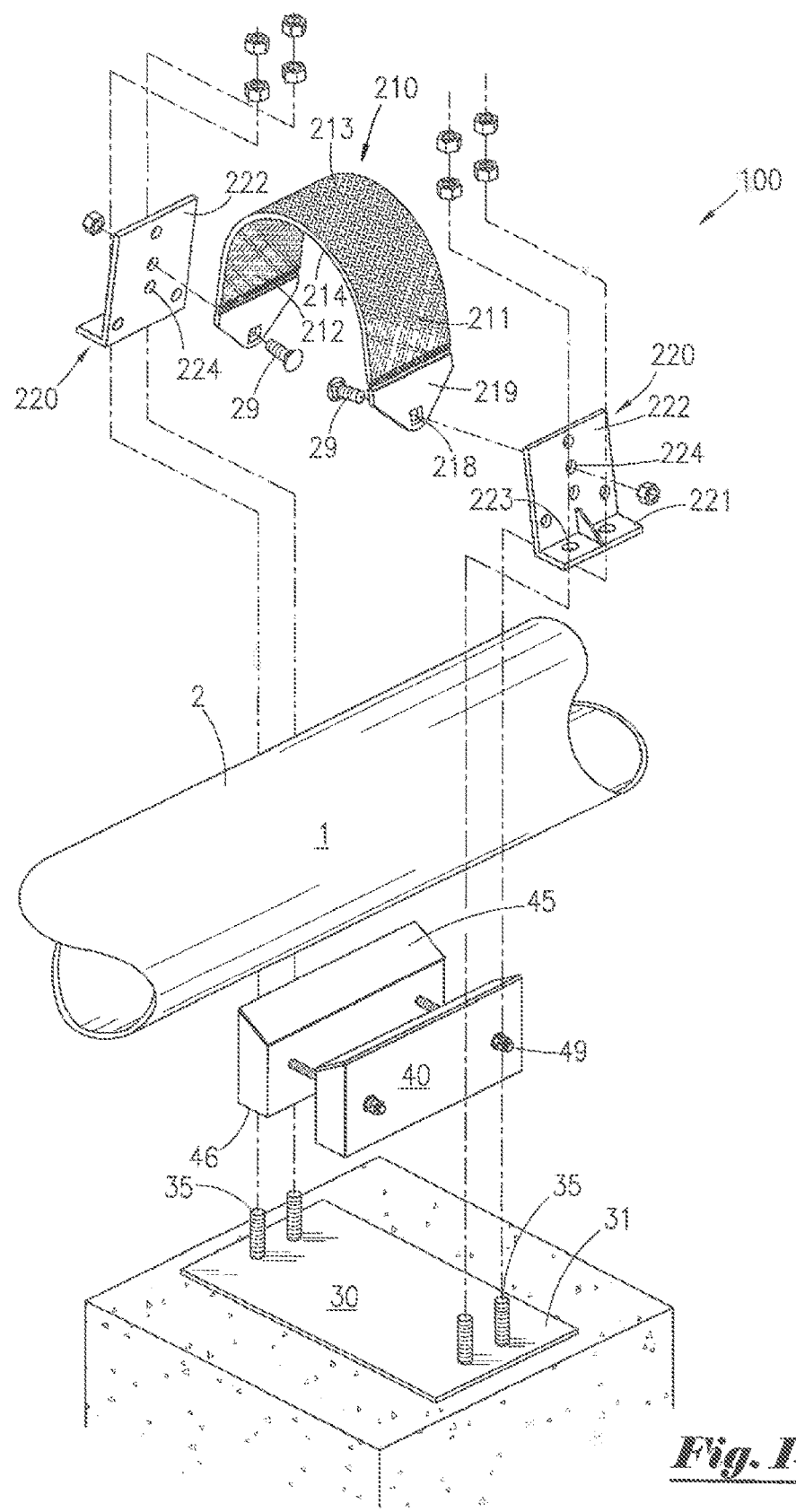
FIG. 14 depicts an exploded view of another alternate embodiment of an adjustable pipe support assembly of the present invention with an adjustable mounting bracket.

FIG. 13 depicts a perspective view of adjustable pipe support assembly 100 comprising strap 210 attachably bolted to adjustable mounting bracket 220, wherein first end 211 of strap 210 comprises an adjustment plate 219. Adjustment plate 219 comprises at least one 218 for use in axially aligning with a single row of apertures 224 on side member 222 of adjustable mounting bracket 220, thereby affixing strap 210 to adjustable mounting bracket 220 by way of bolts 29 therefore being able to tighten and/or loosen strap 210 to a desired size. FIG. 14 depicts an exploded view of adjustable pipe support assembly 100 comprising first end 211 and second end 212 of strap 210 having at least one bore 218 disposed on adjustment plate 219 and side member 222 of adjustable mounting bracket 220 having a single row of apertures 224 for use in tightening and/or loosening strap 210 around pipe 1, as necessary.

Still referring to FIGS. 13 and 14, in an alternate embodiment, strap 210 comprises first end 211 and second end 212, wherein first end 211 and second end 212 both comprise a substantially curved configuration. Further, first end 211 and second end 212 each comprise adjustment plate 219 having aperture 218 for use in attachably connecting to adjustable mounting bracket 220. Side member 222 of adjustable mounting bracket 220 comprises a single row of substantially vertically stacked apertures 224 for use in being able to adjust strap 210 to properly fit around a desired size of pipe. Adjustable mounting bracket 220 further comprises base member 221 having a plurality of apertures 223 that axially align with bolts 35 of base plate 30 in order to connectably attach adjustable mounting bracket 220 to base plate 30.

Still referring to FIG. 14, pipe support assembly 100 further comprises base plate 30 and pipe chocks 40 for use in beneficially supporting and stabilizing a section of pipe 1. Pipe chocks 40 generally comprise angle bar member 43, side bar members 44, and top member 45, wherein planar base 46 of angle bar 43 is adjacently positioned on top surface 31 of base plate 30 and top member 45 of pipe chock 40 is adjacently positioned against outer surface 2 of pipe 1.

Figure 15:
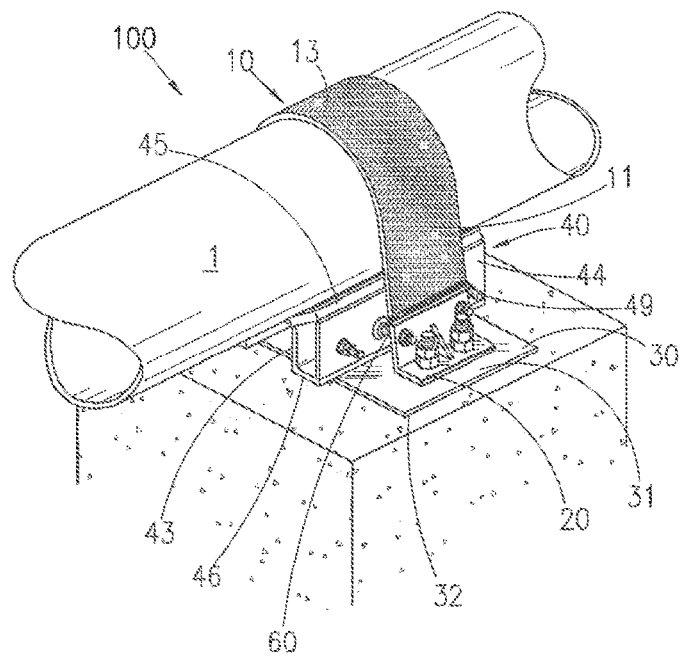
FIG. 15 depicts a perspective view of an additional alternate embodiment of an adjustable pipe support assembly of the present invention with a pipe chock vibration regulator.

FIG. 15 depicts a perspective view of pipe support assembly 100 of the present invention comprising a pipe chock vibration regulator 60 for use with conventional pipe chocks. As illustrated in FIG. 15, pipe support assembly 100 comprises pipe chocks 40 for use in beneficially supporting and stabilizing a section of pipe. Pipe chocks 40 generally comprise angle bar member 43, side bar members 44, top member 45, and pipe chock centralizer 49, wherein planar base 46 of angle bar 43 is adjacently positioned on top surface 31 of base plate 30 and top member 45 of pipe chock 40 is adjacently positioned against outer surface 2 of pipe 1. Further, pipe chock centralizer 49 attachably connects first pipe chock 41 to second pipe chock 42, thereby further reinforcing pipe support assembly 100 and preventing vibration. Additionally, pipe support assembly 100 further comprises pipe chock vibration regulator 60 for use in preventing and regulating any vibratory movements, thereby assisting in maintaining a steady and stable assembly.

Pipe chock vibration regulator 60 comprises a rod-like member having a first end 61 and a second end 62, wherein first end 61 is received within aperture 26 of side member 22 of mounting bracket 20, and thus, bolted to side member 22 of mounting bracket 20, and second end 62 is adjacently engaged against side member 44 of pipe chocks 40. Thus, pipe chock vibration regulator 60 can be retrofit with existing conventional pipe chocks 40, while being able to attachably connect to adjustable pipe support assembly 100 of the present invention. As a result, pipe chock vibration regulator 60 actively engages pipe chocks 40 to mounting brackets 20, thereby minimizing vibration as said pipe is in use.

In addition, as illustrated in FIG. 15, strap 10 comprises first end 11 and second end 12, wherein first end 11 and second end 12 are both joined and connected to mounting bracket 20, thus cooperating to form a single cohesive unit. However, although not depicted in FIG. 15, it is to be observed that pipe chock vibration regulator 60 can also be used in conjunction with adjustable strap and adjustable mounting bracket 120 of the present invention.

Still referring to FIG. 15, mounting bracket 20 further comprises side member 22 and base member 21 wherein side member 22 and base member 21 are oriented in a substantially perpendicular configuration. Base member 21 of mounting bracket 20 comprises bores 23 for use in attachably connecting mounting bracket 20 to base plate 30, wherein base plate 30 further comprises anchor bolts 35 that are axially aligned with bores 23 of base member 21 of mounting bracket 20, thereby allowing anchor bolts 35, or any other similar attachment means, to be received within bores 23 of mounting bracket 20, thus securing bracket 20 and plate 30 together.

Figure 16:
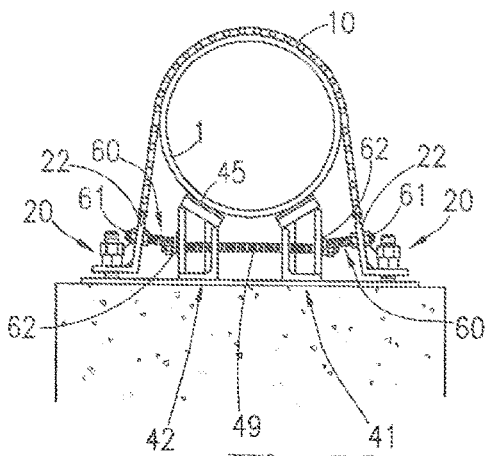
FIG. 16 depicts an end view of an additional alternate embodiment of an adjustable pipe support assembly of the present invention with a pipe chock vibration regulator.
Figure 17:
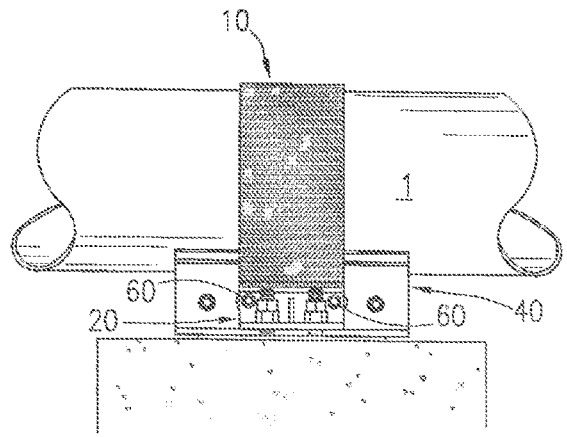
FIG. 17 depicts a side view of an additional alternate embodiment of an adjustable pipe support assembly of the present invention with a pipe chock vibration regulator.

FIG. 16 depicts an end view of pipe support assembly 100 comprising pipe chock vibration regulator 60. FIG. 17 depicts a side view of pipe support assembly 100 comprising pipe chock vibration regulator 60. As illustrated in FIGS. 16 and 17, pipe support assembly 100 comprises pipe chocks 40 for use in beneficially supporting and stabilizing a section of pipe. Pipe chocks 40 generally comprise angle bar member 43, side bar members 44, top member 45, and pipe chock centralizer 49. Additionally, pipe strap assembly 100 further comprises pipe chock vibration regulator 60 for use in preventing and regulating vibratory movements, thereby assisting maintaining a steady and stable assembly.

Pipe chock vibration regulator 60 comprises rod-like member with first end 61 and second end 62, wherein first end 61 is received within aperture 26 of side member 22 of mounting bracket 20, and thus, bolted to side member 22 of mounting bracket 20, and second end 62 is adjacently engaged against side member 44 of pipe chocks 40. Pipe chock vibration regulator 60 can be retrofit with existing conventional pipe chocks 40 or can be manufactured within new pipe chocks, while being able to attachably connect to adjustable pipe support assembly 100 of the present invention. As a result, pipe chock vibration regulator 60 actively engages pipe chocks 40 to mounting brackets 20, thereby minimizing vibration as said pipe is in use.

As illustrated in FIGS. 16 and 17, strap 10 comprises first end 11 and second end 12, wherein first end 11 and second end 12 are both joined and connected to mounting bracket 20, thus cooperating as a single component part of the present invention. However, although not depicted in FIG. 16 or 17, it is to be observed that pipe chock vibration regulator 60 can also be used in conjunction with adjustable strap and adjustable mounting bracket 120 in order to tighten or loosen strap 10 as necessary, and thus, accommodate a variety of different sizes of piping.

Figure 18:
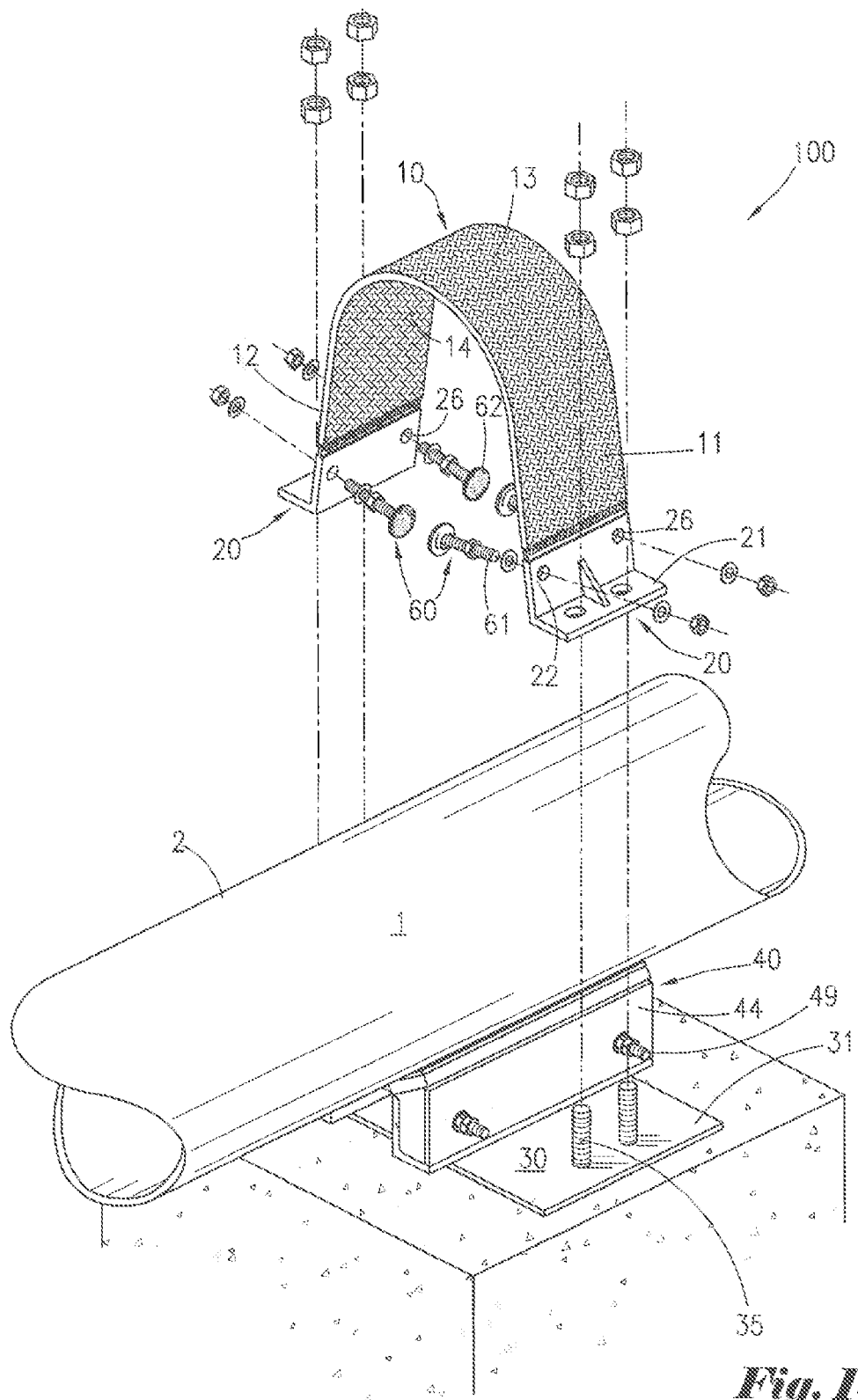
FIG. 18 depicts an exploded view of an additional alternate embodiment of an adjustable pipe support assembly of the present invention with a pipe chock vibration regulator.

FIG. 18 depicts an exploded view of pipe support assembly 100 comprising pipe chock vibration regulator 60. Pipe chock vibration regulator 60 comprises rod-like member with first end 61 and second end 62, wherein first end 61 is received within aperture 26 of side member 22 of mounting bracket 20, and thus, bolted and secured to side member 22 of mounting bracket 20, and second end 62 is adjacently engaged against side member 44 of pipe chocks 40. Pipe chock vibration regulator 60 can be retrofit with existing conventional pipe chocks 40 or can be manufactured within new pipe chocks, while being able to attachably connect to adjustable pipe support assembly 100 of the present invention. As a result, pipe chock vibration regulator 60 actively engages pipe chocks 40 to mounting brackets 20, thereby minimizing vibration as said pipe is in use.

Figure 19:
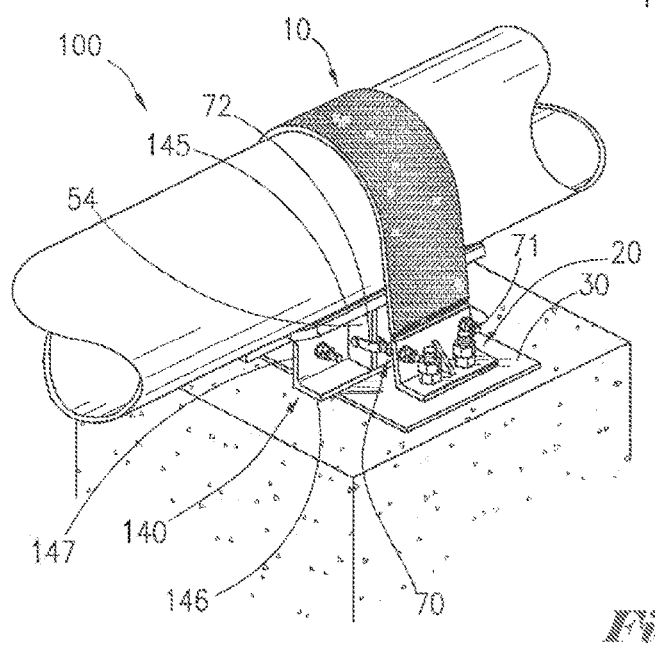
FIG. 19 depicts a perspective view of another alternate embodiment of an adjustable pipe support assembly of the present invention with a shackled vibration regulator.

FIG. 19 depicts a perspective view of pipe support assembly 100 of the present invention comprising pipe chocks 140 having a shackled vibration regulator assembly 70 manufactured within said pipe chocks 140. In an alternate embodiment, as illustrated in FIG. 19, pipe chocks 140 comprise angle bar member 143, slanted top member 145, and a plurality of inner wall members 54, wherein inner wall members 54 are located in a substantially perpendicular location to both side surface 147 and base surface 146 of angle member 143, and are located substantially parallel to each other. Further, base member 146 of angle bar member 143 is disposed on top surface 31 of base plate 30, and inner wall members 54 are positioned in a relatively perpendicular location to side member 22 of mounting bracket 20. Additionally, inner wall members 54 each comprise an aperture 58 for use as a connection point with shackled vibration regulator 70.

Mounting bracket 20 comprises side member 22 and base member 21, wherein side member 22 and base member 21 are oriented in a substantially perpendicular configuration. Base member 21 of mounting bracket 20 comprises a plurality of bores 23 for use in attachably connecting mounting bracket 20 to base plate 30, wherein base plate 30 further comprises anchor bolts 35 that are axially aligned with bores 23 of base member 21 of mounting bracket 20, thereby allowing anchor bolts 35, or any other similar attachment means, to be received within bores 23 of mounting bracket 20, thus securing bracket 20 and plate 30 together. Additionally, as illustrated in FIG. 19, side member 22 of mounting bracket 20 comprises a plurality of apertures 26 for use in receiving shackled vibration regulator assembly 70, and ultimately, for connecting mounting brackets 20 to pipe chocks 40.

In an alternate embodiment, shackled vibration regulator 70 comprises a rod-like member having a first end 71 and a second end 72, wherein a first end 71 is received within aperture 26 of side member 22 of mounting bracket 20, and thus, bolted to side member 22 of mounting bracket 20, and second end 72 is attachably bolted to inner wall members 54 of pipe chocks 140. Second end 72 of shackled vibration regulator 70 comprises a substantially "U" shaped shackle member 73, wherein shackle member 73 latches around inner wall members 54, and thus, axially aligns with apertures 58 of inner wall members 54. Further, shackle member 73 of second end 72 of shackled vibration regulator 70 allows for pipe chocks 140 to be pulled in a relatively outward direction, thereby creating an additional means of inspecting an outer coating 2 of said pipe 1.

Still referring to FIG. 19, strap 10 comprises first end 11 and second end 12, wherein first end 11 and second end 12 are both joined and connected to mounting bracket 20, thus cooperating to form a single cohesive unit. However, although not illustrated in FIG. 19, it is to be observed that pipe chocks 140 having a shackled vibration regulator assembly 70 can also be used in conjunction with adjustable strap and adjustable mounting bracket 120 in order to accommodate a variety of different sizes of piping.

Figure 20:
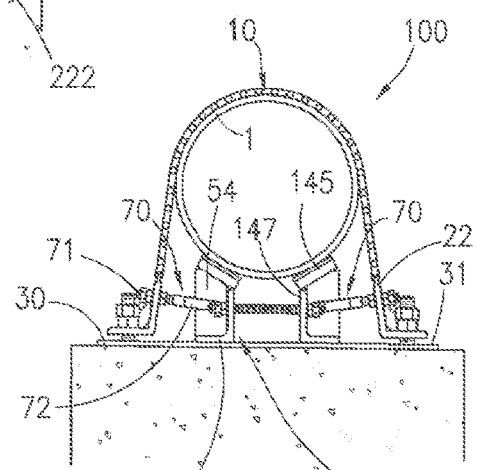
FIG. 20 depicts an end view of another alternate embodiment of an adjustable pipe support assembly of the present invention with a shackled vibration regulator.

FIG. 20 depicts an end view of pipe support assembly 100 comprising shackled vibration regulator 70. In an alternate embodiment, as illustrated in FIG. 20, pipe chocks 140 comprise angle bar member 143, slanted top member 145, and inner wall members 54, wherein inner wall members 54 are located in a substantially perpendicular location to both side surface 147 and base surface 146 of angle member 143, and are located substantially parallel to each other. Further, base member 146 of angle bar member 143 is disposed on top surface 31 of base plate 30, and inner wall members 54 are positioned in a relatively perpendicular location to side member 22 of mounting bracket 20. Additionally, inner wall members 54 each comprise aperture 58 for use as a connection point with shackled vibration regulator 70.

Still referring to FIG. 20, mounting bracket 20 comprises side member 22 and base member 21, wherein side member 22 and base member 21 are oriented in a substantially perpendicular configuration. Base member 21 of mounting bracket 20 comprises bores 23 for use in attachably connecting mounting bracket 20 to base plate 30 by way of anchor bolts 35 that are axially aligned with bores 23 of base member 21 of mounting bracket 20, thereby allowing anchor bolts 35, or any other similar attachment means, to be received within bores 23 of mounting bracket 20, thus securing bracket 20 and plate 30 together. Additionally, side member 22 of mounting bracket 20 comprises apertures 26 for use in receiving shackled vibration regulator assembly 70, and ultimately, for connecting mounting brackets 20 to pipe chocks 140.

Further, in an alternate embodiment, shackled vibration regulator 70 comprises rod-like member with first end 71 and second end 72, wherein first end 71 is received within aperture 26 of side member 22 of mounting bracket 20, and thus, secured to side member 22 of mounting bracket 20 by way of bolts, or any other secure attachment means, and second end 72 is attachably bolted to inner wall members 54 of pipe chocks 140. Second end 72 of shackled vibration regulator 70 comprises substantially "U" shaped shackle member 73, wherein shackle member 73 latches around inner wall members 54, and thus, axially aligns with apertures 58 of inner wall members 54. Further, shackle member 73 of second end 72 of shackled vibration regulator 70 allows for pipe chocks 140 to be pulled in a relatively outward direction, thereby creating an additional means of inspecting an outer coating 2 of said pipe 1.

As illustrated in FIG. 20, strap 10 comprises first end 11 and second end 12, wherein first end 11 and second end 12 are both joined and connected to mounting bracket 20, thus cooperating as a single component part of the present invention. However, although not depicted in FIG. 20, it is to be observed that shackled vibration regulator 70 can also be used in conjunction with adjustable strap and adjustable mounting bracket 120 in order to tighten or loosen strap 10 as necessary, and thus, accommodate a variety of different sizes of piping.

Figure 21:
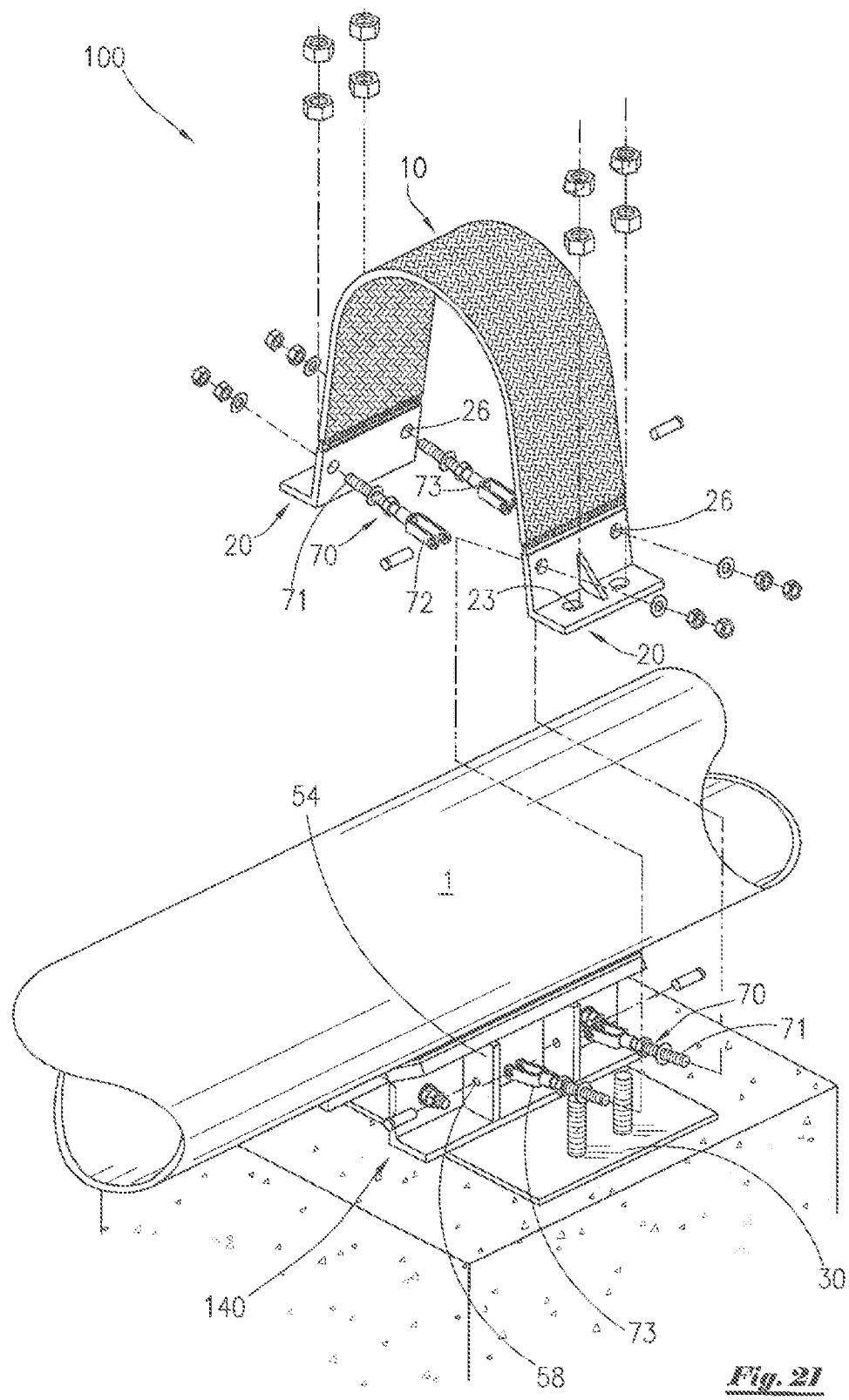
FIG. 21 depicts an exploded view of another alternate embodiment of an adjustable pipe support assembly of the present invention with a shackle vibration regulator.

FIG. 21 an exploded view of pipe support assembly 100 comprising shackled pipe chock vibration regulator 70. In an alternate embodiment, as illustrated in FIG. 21, pipe chocks 140 comprise angle bar member 143, slanted top member 145, and inner wall members 54, wherein inner wall members 54 are located in a substantially perpendicular location to both side surface 147 and base surface 146 of angle member 143, and are located substantially parallel to each other. Further, base member 146 of angle bar member 143 is disposed on top surface 31 of base plate 30, and inner wall members 54 are positioned in a relatively perpendicular location to side member 22 of mounting bracket 20. Additionally, inner wall members 54 each comprise aperture 58 for use as a connection point with shackled vibration regulator 70.

Still referring to FIG. 21, mounting bracket 20 comprises side member 22 and base member 21, wherein side member 22 and base member 21 are oriented in a substantially perpendicular configuration. Base member 21 of mounting bracket 20 comprises bores 23 for use in attachably connecting mounting bracket 20 to base plate 30 by way of anchor bolts 35 that are axially aligned with bores 23 of base member 21 of mounting bracket 20, thereby allowing anchor bolts 35, or any other similar attachment means, to be received within bores 23 of mounting bracket 20, thus securing bracket 20 and plate 30 together. Additionally, as illustrated in FIG. 21, side member 22 of mounting bracket 20 comprises apertures 26 for use in receiving shackled vibration regulator assembly 70, and ultimately, for connecting mounting brackets 20 to pipe chocks 140.

Further, in an alternate embodiment, shackled vibration regulator 70 comprises rod-like member with first end 71 and second end 72, wherein first end 71 is received within aperture 26 of side member 22 of mounting bracket 20, and thus, bolted to side member 22 of mounting bracket 20, and second end 72 is attachably bolted to inner wall members 54 of pipe chocks 140. Second end 72 of shackled vibration regulator 70 comprises substantially "U" shaped shackle member 73, wherein shackle member 73 latches around inner wall members 54, and thus, axially aligns with apertures 58 of inner wall members 54. Further, shackle member 73 of second end 72 of shackled vibration regulator 70 allows for pipe chocks 140 to be pulled in a relatively outward direction, thereby creating an additional means of inspecting an outer coating 2 of said pipe 1.

As illustrated in FIG. 21, strap 10 comprises first end 11 and second end 12, wherein first end 11 and second end 12 are both joined and connected to mounting bracket 20, thus cooperating as a single component part of the present invention. However, although not depicted in FIG. 21, it is to be observed that shackled vibration regulator 70 can also be used in conjunction with adjustable strap and adjustable mounting bracket 120 in order to tighten or loosen strap 10 as necessary, and thus, accommodate a variety of different sizes of piping.

Figure 22:
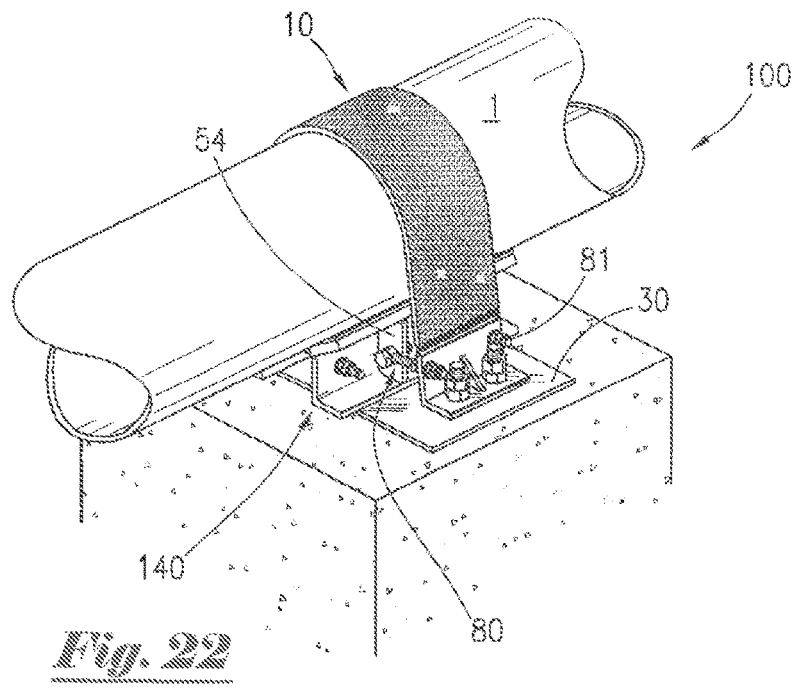
FIG. 22 depicts a perspective view of an additional alternate embodiment of an adjustable pipe support assembly of the present invention with a bolted vibration regulator.
Figure 23:
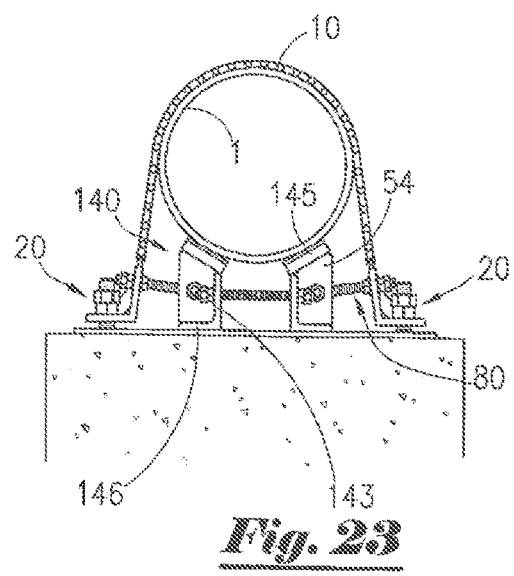
FIG. 23 depicts an end view of an additional alternate embodiment of an adjustable pipe support assembly of the present invention with a bolted vibration regulator.

FIG. 22 depicts a perspective view of pipe support assembly 100 of the present invention comprising pipe chocks 140 having a bolted vibration regulator assembly 80 manufactured within said pipe chocks 140. FIG. 23 depicts an end view of pipe support assembly 100 comprising bolted vibration regulator 80. In an alternate embodiment, as illustrated in FIGS. 22 and 23, pipe chocks 140 comprise angle bar 143 member, slanted top member 145, and inner wall members 54, wherein inner wall members 54 are located in a substantially perpendicular location to both side surface 147 and base surface 146 of angle member 143, and are located substantially parallel to each other. Further, base member 146 of angle bar member 143 is disposed on top surface 31 of base plate 30, and inner wall members 54 are positioned in a relatively perpendicular location to side member 22 of mounting bracket 20. Additionally, inner wall members 54 each comprise aperture 58 for use as a connection point with bolted vibration regulator 80.

Still referring to FIGS. 22 and 23, mounting bracket 20 comprises side member 22 and base member 21, wherein side member 22 and base member 21 are oriented in a substantially perpendicular configuration. Base member 21 of mounting bracket 20 comprises bores 23 for use in attachably connecting mounting bracket 20 to base plate 30, wherein base plate 30 further comprises anchor bolts 35 that are axially aligned with bores 23 of base member 21 of mounting bracket 20, thereby allowing anchor bolts 35, or any other similar attachment means, to be received within bores 23 of mounting bracket 20, thus securing bracket 20 and plate 30 together. Additionally, as illustrated in FIGS. 22 and 23, side member 22 of mounting bracket 20 comprises apertures 26 for use in receiving bolted vibration regulator assembly 80, and ultimately, for connecting mounting brackets 20 to pipe chocks 140.

In an alternate embodiment, bolted vibration regulator assembly 80 comprises a rod-like member having a first end 81 and a second end 82, wherein first end 81 is received within aperture 26 of side member 22 of mounting bracket 20, and thus, bolted to side member 22 of mounting bracket 20, and second end 82 is attachably bolted to inner wall members 54 of pipe chocks 140. Second end 82 of bolted vibration regulator 80 comprises a substantially circular hole 83, wherein said hole 83 axially aligns with apertures 58 of inner wall members 54, thereby allowing hole 83 of second end 82 of bolted vibration regulator 80 to be bolted and locked to inner wall members 54. As a result, bolted vibration regulator 80 provides for a secure connection between pipe chocks 140 and pipe support assembly 100 in order to prevent vibration, while also allowing for pipe chocks 140 to be unbolted, and thus, pulled in a relatively outward direction, thereby creating an additional means of inspecting an outer coating 2 of said pipe 1.

As illustrated in FIGS. 22 and 23, strap 10 comprises first end 11 and second end 12, wherein first end 11 and second end 12 are both joined and connected to mounting bracket 20, thus cooperating as a single component part of the present invention. However, although not depicted in FIGS. 22 and 23, it is to be observed that pipe chock vibration regulator 80 can also be used in conjunction with adjustable strap and adjustable mounting bracket 120 in order to tighten or loosen strap 10 as necessary, and thus, accommodate a variety of different sizes of piping.

Figure 24:
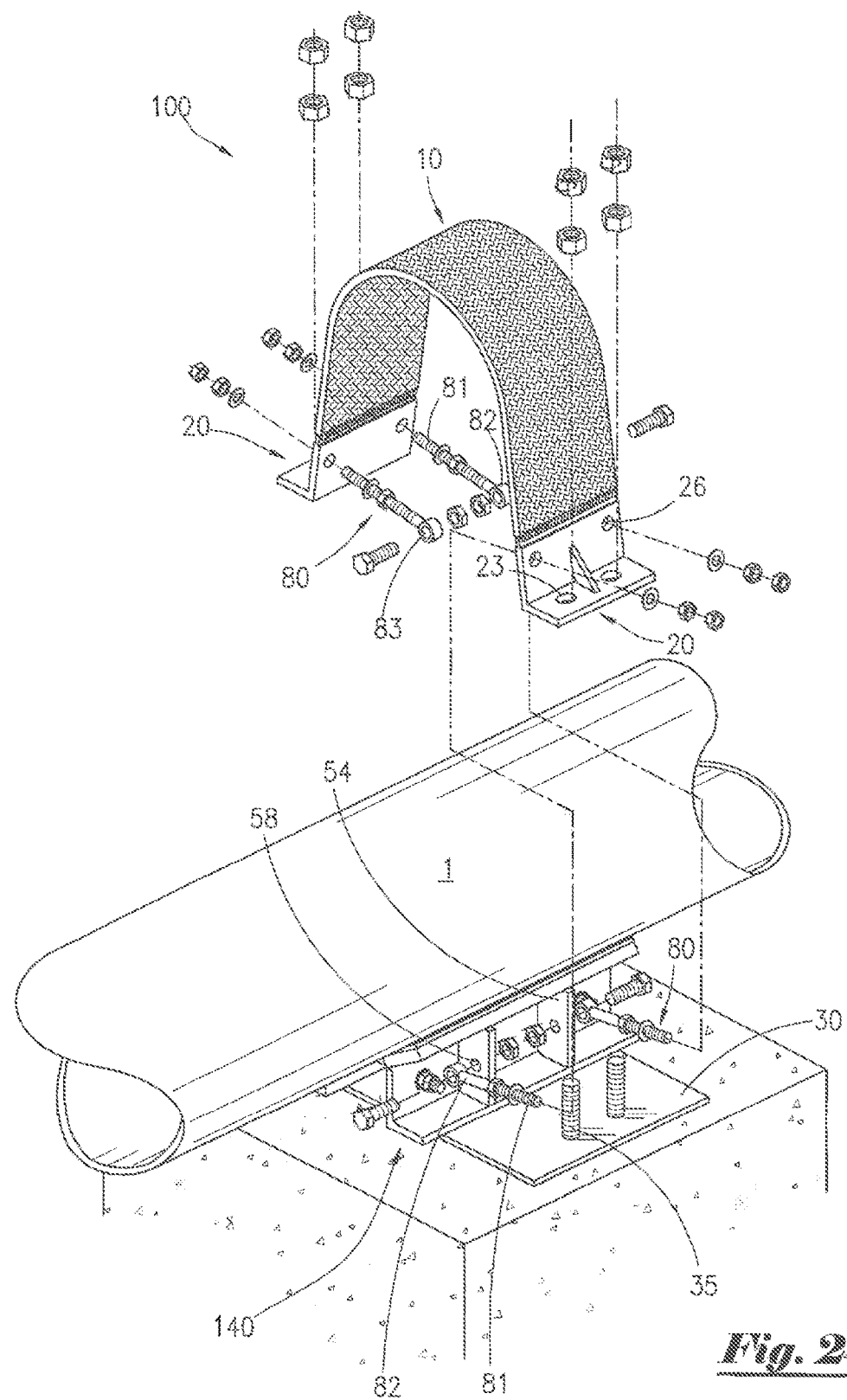
FIG. 24 depicts an exploded view of an additional alternate embodiment of an adjustable pipe support assembly of the present invention with a bolted vibration regulator.

FIG. 24 depicts an exploded view of pipe support assembly 100 comprising bolted pipe chock vibration regulator 80. In an alternate embodiment, as illustrated in FIG. 24, pipe chocks 140 comprise angle bar member 143, slanted top member 145, and inner wall members 54, wherein inner wall members 54 are located in a substantially perpendicular location to both side surface 147 and base surface 146 of angle member 143, and are located substantially parallel to each other. Further, base member 146 of angle bar member 143 is disposed on top surface 31 of base plate 30, and inner wall members 54 are positioned in a relatively perpendicular location to side member 22 of mounting bracket 20. Additionally, inner wall members 54 each comprise aperture 58 for use as a connection point with bolted vibration regulator 80.

Still referring to FIG. 24, mounting bracket 20 comprises side member 22 and base member 21, wherein side member 22 and base member 21 are oriented in a substantially perpendicular configuration. Base member 21 of mounting bracket 20 comprises bores 23 for use in attachably connecting mounting bracket 20 to base plate 30, wherein base plate 30 further comprises anchor bolts 35 that are axially aligned with bores 23 of base member 21 of mounting bracket 20, thereby allowing anchor bolts 35, or any other similar attachment means, to be received within bores 23 of mounting bracket 20, thus securing bracket 20 and plate 30 together. Additionally, as illustrated in FIG. 24, side member 22 of mounting bracket 20 comprises apertures 26 for use in receiving bolted vibration regulator assembly 80, and ultimately, for connecting mounting brackets 20 to pipe chocks 140.

Bolted vibration regulator assembly 80 comprises a rod-like member having first end 81 and second end 82, wherein first end 81 is received within aperture 26 of side member 22 of mounting bracket 20, and thus, bolted to side member 22 of mounting bracket 20, and second end 82 is attachably bolted to inner wall members 54 of pipe chocks 140. Second end 82 of bolted vibration regulator 80 comprises substantially circular hole 83, wherein said hole 83 axially aligns with apertures 58 of inner wall members 54, thereby allowing hole 83 of second end 82 of bolted vibration regulator 80 to be bolted and locked to inner wall members 54. As a result, bolted vibration regulator 80 provides for a secure connection between pipe chocks 140 and pipe support assembly 100 in order to prevent vibration, while also allowing for pipe chocks 140 to be unbolted, and thus, pulled in a relatively outward direction, thereby creating an additional means of inspecting an outer coating 2 of said pipe 1.

As illustrated in FIG. 24, strap 10 comprises first end 11 and second end 12, wherein first end 11 and second end 12 are both joined and connected to mounting bracket 20, thus cooperating as a single component part of the present invention. However, although not depicted in FIG. 24, it is to be observed that pipe chock vibration regulator 80 can also be used in conjunction with adjustable strap and adjustable mounting bracket 120 in order to tighten or loosen strap 10 as necessary, and thus, accommodate a variety of different sizes of piping.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. An adjustable pipe strap apparatus for use in supporting and stabilizing pipes and other tubular members comprising:
   a. a flexible strap having a first end and a second end;
   b. a bracket member adapted to connect to each of said first end and said second end of said strap;
   c. a base plate member adapted to secure each of said bracket members to a surface, wherein said base plate member comprises a plurality of bolts that extend in a relatively upward direction from said surface, and wherein said bracket members are adapted to attachably connect to said bolts; and
   d. a plurality of pipe chocks disposed between said first end and said second end of said strap, wherein:
      i. said pipe chocks support a section of a pipe;
      ii. said pipe chocks comprise a centralizer that attachably connects to and is disposed between said pipe chocks to stabilize said pipe; and
      iii. said pipe chocks comprise a vibration regulator that attachably connects said pipe chocks to each of said bracket members to further eliminate movement of said apparatus.

2. The adjustable pipe strap apparatus of claim 1, wherein said vibration regulator comprises a shackle member.

3. The adjustable pipe strap apparatus of claim 1, wherein said vibration regulator comprises a bolted member.

4. A method for supporting and stabilizing pipes and other tubulars in the gas industry comprising:
   a. adjusting a pipe strap apparatus in order to securely support said pipe, wherein said pipe strap apparatus comprises:
      i. a flexible strap having a first end and a second end;
      ii. a bracket member adapted to connect to each of said first end and said second end of said strap;
      iii. a base plate member adapted to secure each of said bracket members to a surface, wherein said base plate member comprises a plurality of bolts that extend in a relatively upward direction from said surface, and wherein said bracket members are adapted to attachably connect to said bolts;
      iv. a plurality of pipe chocks disposed between said first end and said second end of said strap, wherein:
         I. said pipe chocks support a section of a pipe,
         II. said pipe chocks comprise a centralizer that attachably connects to and is disposed between said pipe chocks to stabilize said pipe,
         III. said pipe chocks comprise a vibration regulator that attachably connects said pipe chocks to each of said bracket members to further eliminate movement of said apparatus; and
   b. bolting said bracket members to said base plate member.

5. The method of claim 4, wherein said vibration regulator comprises a shackle member.

6. The method of claim 4, wherein said vibration regulator comprises a bolted member.

* * * * *